United States Patent

[11] 3,597,537

[72] Inventors Mikio Kudo;
 Kunio Tsuboi, both of Kanagowa-ken, Japan
[21] Appl. No. 829,500
[22] Filed June 2, 1969
[45] Patented Aug. 3, 1971
[73] Assignee Sony Corporation
 Tokyo, Japan

[54] IMPLOSION-RESISTANT CATHODE-RAY TUBE UTILIZING A METAL BAND
 10 Claims, 5 Drawing Figs.
[52] U.S. Cl. .................................................... 178/7.8,
  178/7.82, 220/2.1 A
[51] Int. Cl. .................................................. H04n 5/645
[50] Field of Search ............................................ 178/7.8,
  7.82; 220/2.1 A, 2.3 A

[56] References Cited
UNITED STATES PATENTS
2,851,679 9/1958 Wayne ......................... 178/7.8

| 2,970,311 | 1/1961 | De Napozi ..................... | 178/7.8 |
| 3,162,933 | 12/1964 | Trax ............................. | 220/2.1 A |
| 3,248,480 | 4/1966 | Browning ..................... | 220/2.1 A |
| 3,512,234 | 5/1970 | Bongenaar .................... | 178/7.82 |

Primary Examiner—Robert L. Griffin
Assistant Examiner—Joseph A. Orsino, Jr.
Attorneys—Albert C. Johnston, Robert E. Isner, Lewis H. Eslinger and Alvin Sinderbrand ABSTRACT: A cathode-ray tube having a metal band wrapped therearound, the ends of the metal band being welded together. The metal band has projections which are available for tensioning the metal band lapped end portions which are electrically welded to each other for securing the tensioned band on the tube, at least one of the lapped end portions has projections which extend therefrom to define a restricted region of contact with another of the lapped end portions at which the welding is effected, and at least one of the extending projections is adapted to engage the tube surface so as to space the outermost of the lapped end portions from the end portion overlapped thereby except at the restricted region of contact.

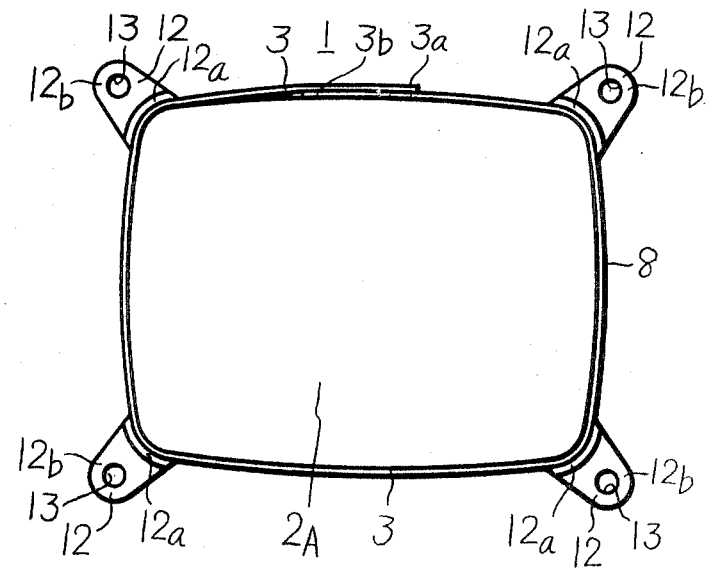
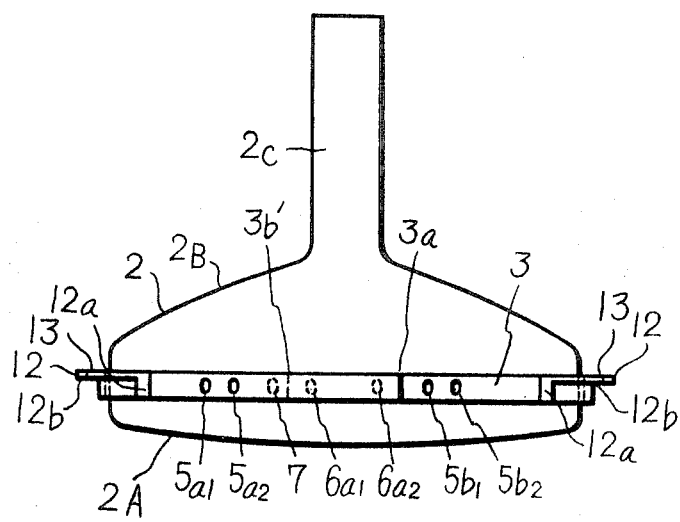
INVENTORS
MIKIO KUDO
KUNIO TSUBOI

3,597,537

IMPLOSION-RESISTANT CATHODE-RAY TUBE UTILIZING A METAL BAND

BACKGROUND OF THE INVENTION

1. Field of the Invention

This invention relates to an implosion-resistant cathode-ray tube of the type that a metal band is wrapped around the envelope of the tube at the face portion or at the joint of the face portion and the funnel portion so as to avoid implosion of the tube envelope.

2. Description of the Prior Art

It is well known in the art that tube implosion can be prevented by wrapping a metal band around the tube envelope at the face portion or at the joint of the face portion and the funnel portion and by applying tension thereto as disclosed, for example, in the U.S. Pat. No. 3,162,933, issued Dec. 29, 1964.

However, this method requires the provision of electrodes on both surfaces of the band and this work is complicated and necessitates the use of a specific device. Further, the conventional method presents a problem in projecting welding such as by series welding indirect weld or the like such that current for welding both ends of the band does not concentrate on the welding points resulting in unnecessary power consumption and imperfect welding.

SUMMARY OF THE INVENTION

This invention is to eliminate the drawbacks encountered in the prior art by providing a tensioned compression band ends with projections at at least one end for projection welding and for holding both ends of the band in a spaced relationship when the band has been wrapped in position to be welded around the envelope of a cathode-ray tube.

One object of this invention is to assure tight clamping of the envelope of a cathode-ray tube by mechanically coupling both ends of a metal band wrapped around the tube envelope.

Another object of this invention is to facilitate right clamping of a metal band on the envelope of a cathode-ray tube.

BRIEF DESCRIPTION OF THE DRAWING

FIG. 1 is a front view of an implosion-resistant cathode-ray tube in accordance with one example of this invention;

FIG. 2 is a side view of the cathode-ray tube shown in FIG. 1;

DESCRIPTION OF THE PREFERRED EMBODIMENTS

Figure 3:
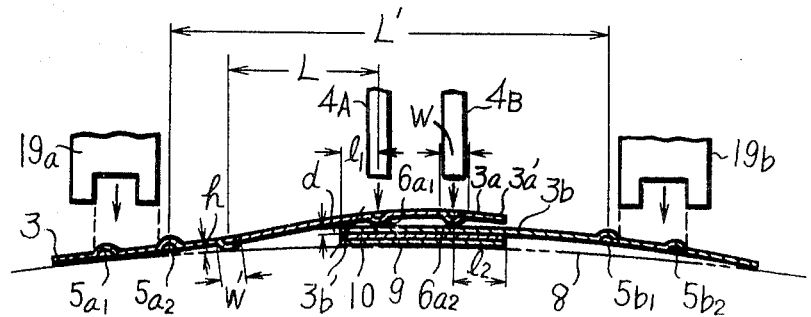
FIG. 3 is a cross-sectional view showing a principal part of this invention.

Referring to FIGS. 1 to 3, a detailed description will be first given one embodiment of this invention. Reference numeral 1 indicates generally a cathode-ray tube produced according to this invention and 2 generally the tube envelope consisting of a faceplate 2A, a funnel 2B and a neck 2C. The faceplate 2A and the funnel 2B may be formed integral with each other or may be joined together.

In accordance with the present invention a strap of high-tension steel such as a metal bond containing, for example, less than 0.2 percent of carbon and being, for example, 0.6 to 1 mm. thick and 16 mm. wide, is wrapped around the tube envelope 2 on the periphery of the faceplate 2A in the vicinity of the front thereof or when utilized with a tube envelope 2 composed of joined portions, may be wrapped around the joint formed by the faceplate 2A and the funnel 2B, and both ends 3a and 3b of the metal band 3 are tightly coupled together.

In this case a deformable member, or sheet being composed of Teflon (trademark), vinyl, paper or some other deformable materials of low friction to the tube envelope 2 and the metal band 3 is interposed between the metal band 3 and the peripheral surface of the envelope 2 to thereby decrease the frictional resistance of the metal band 3 to the envelope 2 so as to insure clamping of the band 3 on the envelope 2. In the event that the coupling of the both ends of the metal band 3 takes place by means of welding, the sheet 8 is formed of a heat-resistant and adiabatic material to ensure that no crack is produced in the tube envelope 2 due to the heat of welding.

Further, in the case where the tube envelope 2 is for example for an 11-inch television receiver and the length of the outer periphery of the faceplate 2A is 820 mm., the metal band 3 may be selected to be approximately 867 mm. long so that when the band 3 has been wrapped around the tube envelope 2 the both ends $3a$ and $3b$ of the band 3 overlap each other these overlapped portions may then be coupled together by welding The metal band 3 has formed therein at a position a little outside of the overlapping ends $3a$ and $3b$ projecting portions engaging jigs $19a$ and $19b$ shown in FIG. 3 for clamping the metal band 3 on the tube envelope 2. The engaging portions each may consist of, projections in pairs such as $5a_1$, $5a_2$ and $5b_1$, $5b_2$ which may be formed by embossing the band 3 at predetermined locations and intervals. The projections $5a_1$, $5a_2$ and $5b_1$, $5b_2$ may be formed across the metal band 3 in its widthwise direction as shown in FIG. 2.

Figure 4:
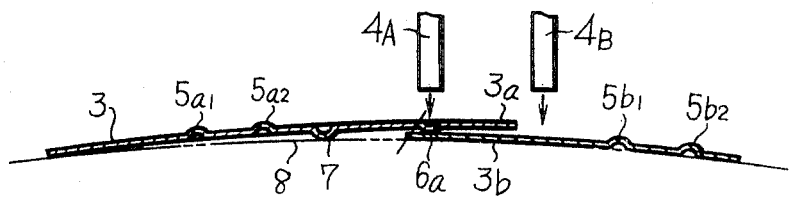
FIGS. 4 and 5 are cross-sectional views showing other examples of this invention.

In the embodiment shown in FIGS. 3 and 4, a pair of projections $6a_1$ and $6a_2$ to be utilized for projections welding such as series welding or indirect welding may be similarly formed on one end portion $3a$ of the overlapping ends $3a$, $3b$ by embossing and project inwardly into point or, line contact with the outer surface of the other end portion $3b$. In the case, where the projections $6a_1$ and $6a_2$ are formed so as to make line contact with the other end portion $3b$, they may be formed across the metal band 3 as shown in FIG. 2.

In the embodiment shown in FIGS. 3 and 4, at that point of the end portion $3a$ of the band 3 which does not overlie the other end portion $3b$ but is adjacent the end $3b'$ of the end portion $3b$, another projection bolster 7, is formed by, for example, embossing the metal band 3 in its widthwise direction, as shown in FIG. 2, which bolster 7 abuts on the peripheral surface of the tube envelope 2 directly or indirectly, in the illustrated example, through the sheet 8. When the both end portions $3a$ and $3b$ of the metal band 3 are overlapped the overlying end portion $3a$ is spaced by the bolster 7 apart from the other end portion $3b$ to ensure that the end $3b'$ of the other end portion $3b$ is held out of contact with the inner surface of the end portion $3a$ or that the former is held in incomplete contact with the latter.

An adiabatic material 9 such as glass cloth or the like, and a good conductive plate 10 such as copper, aluminum or the like, having a thickness of approximately 0.1 or 0.3 mm. may be disposed on the sheet 8 underlying the metal band 3 at that area where the both end portions $3a$ and $3b$ of the band 3 are welded together in overlapping relation to each other as shown in FIG. 3.

The metal band 3 may be tightly wrapped around the tube envelope 2 in the following manner. The metal band 3 is wound on the tube envelope 2 and is clamped such as to cause the band to be to approach the tube envelope 2 under a predetermined pressure of, for example, 500 to 600 kg. by clamping jigs $19a$ and $19b$ which are placed into engagement with the projections $5a_1$, $5a_2$ and $5b_1$, $5b_2$ of the metal band 3. The tips of welding electrodes 4A and 4B are placed on the backs or smooth side of the projections $6a_1$ and $6a_2$ of the end portion $3a$ of the metal band 3 and a current is instantaneously applied across the electrodes 4A and 4B, thereby welding the end portions $3a$ and $3b$ together at the portion adjacent the tips of the electrodes 4A and 4B. In this case a current path is formed from the electrode 4A to the electrode 4B through the projection $6a_1$, the good conductive plate 10 and the projection $6a_2$, and the current density is great at the tips of the projections $6a_1$ and $6a_2$ where the cross section of the current path is small and consequently first the tips of the projections $6a_1$ and $6a_2$ are subjected to projection welding by the Joule heat of the current, then the projections $6a_1$ and $6a_2$ are crushed by the tips of the electrodes 4A and 4B, and both entire projections $6a_1$ and $6a_2$ are subjected to projection welding by increased current.

On the outside of the metal band 3 at its four corners there may be mounted fixtures 12 for securing the tube envelope 2 to, for example, a stationary part such as a cabinet. The fixtures 12 are bent generally in the form of an L in cross secton. One bent plate portion 12a of each fixture 12 is curved to conform to the outer surface of the corner of the metal band 3 and a pair of welding electrodes, similar to the aforementioned ones 4A and 4B are placed on the plate portion 12a and a current is applied across them, thus welding each fixture to the metal band 3. For this welding process inward projections may be provided on the plate portion 12a of each fixture 12 at places where welding is achieved, in which case each fixture is welded to the metal band 3 by welding electrodes placed on the backs of the projections. In addition, an adiabatic material 9 and a good conductive plate 10 may be interposed between the metal band 3 and the sheet 8 at a position underlying the plate portion 12a of each fixture 12, though not shown. An aperture 13 for a clamp screw or the like may be bored through the other plate portion 12b of each fixture 12.

The width $W$ of the base of each of the projections $6a_1$ and $6a_2$ of the metal band 3 may be selected to be about 3.8 mm. It is preferable to select the distance $l_1$ from the top of the projection $6a_1$ to the end $3b'$ of the metal band 3 and the distance $l_2$ from the top of the projection $6a_2$ to the end $3a'$ of the band to be substantially equal. Furthermore, it is all preferable to select the distances $l_1$ and $l_2$ to be more than three times the width $W$ of the projections $6a_1$ and $6a_2$. If, however, the length of the metal band 3 is constant, the distance $l_1$ varies with the length of the outer periphery of the tube envelope 2 around which the metal band 3 is to be wrapped. Accordingly, in order that the distances $l_1$ and $l_2$ may always exceed $3W$, even when the length of the outer periphery of the tube envelope is greater than a predetermined value, the distances $l_1$ and $l_2$ are selected such that $l_1 = l_2 > 3W + \alpha$ where the error is $\pm \alpha$, in anticipation of this error. In the case of, for example, an 11-inch cathode-ray tube, the length of the outer periphery of the faceplate 2A may be 820 mm. and the error in manufacture is about $\pm 5$ mm., and hence the distances $l_1$ and $l_2$ are selected such that $l_1 = l_2 \approx 3 \times 4 + 5 = 17$ mm. where the width is approximately 4 mm. The height $h$ of the bolster 7 may preferably be selected to be greater than or equal to the thickness $d$ of the metal band 3. Furthermore, the distance $L$ between the bolster 7 and the projection $6a_1$ adjacent thereto is selected to provide a gap between the bolster 7 and the end $3b'$ of the end portion 3. However, the distance $L$ also varies with the length of the outer periphery of the faceplate 2A of the tube envelope 2. If the entire length of the metal band 3 is constant, the distance $L$ increases with a decrease in the length of the outer periphery of the faceplate 2A. Accordingly, the distance $L$ is selected as follows:

$$L > l_1 + \alpha + 1/2 W'$$
$$L > 3W + 2\alpha + 1/2 W'$$

where $W'$ is selected to be the same as the width of the bolster 7.

The distance $L'$ between the projections $5a_2$ and $5b_1$ is minimized so that the pressure applied to the tube envelope 2 per unit length when clamping the metal band 3 by the jigs 19a and 19b may be substantially equal to the pressure per unit length of the metal band 3 exerted on the envelope 2 after the both end portions 3a and 3b of the band 3 has been coupled together and the clamping force by the jigs 19a and 19b has been removed, so as to ensure tight clamping of the metal band 3 on the tube envelope 2.

With the above arrangement of this invention, the end $3b'$ of the metal band 3 is prevented from good contact with the end portions 3a by the provision of the bolster 7 in the metal band 3, thereby to ensure avoidance of incomplete welding at the projection $6a_1$. Due to the presence of the bolster 7, when a current is applied to the electrodes 4A and 4B it does not flow through the end $3b'$ and the end portion 3a of the metal band 3 and no bypass is formed relative to the current path through the projection $6a_1$ and accordingly the current flowing through the tip of the projection $6a_1$ does not decrease.

In the absence of the bolster 7, the end $3b'$ of the band 3 rubs the inner surface of the end portion 3a to scrape off oxide films, dust and the like on their contact surface, so that the end $3b'$ and the end portion 3a makes electrically good contact with each other and greatly increases the leakage current passing therethrough. However, the present invention avoids such a defect and ensures excellent welding.

Where the distances $l_1$ and $l_2$ from the projections $6a_1$ and $6a_2$ to the ends $3a'$ and $3b'$ of the metal band 3 are selected to be substantially equal to each other, temperature distributions in the overlapping end portions 3a and 3b are substantially symmetrical relative to the center between the projections $6a_1$ and $6a_2$ and the welding portions at the projections and $6a_2$ are heated uniformly, so that they are welded uniformly. If the temperature distributions are nonuniform and one of the projections $6a$ or $6a_2$ is heated at a higher temperature, excessive welding results, thereby lowering the weld strength. With the present invention, however, such a lowering in strength is not likely to occur.

Figure 5:
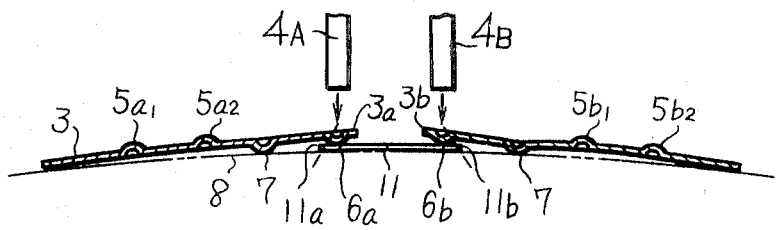

In the previously described embodiment shown in FIG. 3, the end portions 3a and 3b of the metal band 3 are welded together at two points, that is, at the projections $6a_1$ and $6a_2$, but they may be welded together at one point as shown the embodiment shown in FIG. 4. In this embodiment, one projection $6a$, similar to those $6a_1$ and $6a_2$, is formed on the end portion 3a and a current is applied across one electrode 4A placed on the back or smooth side of the projection $6a$ and the other electrode 4B placed on the end $3b$ of the band 3, thereby to effect welding at the projection $6a$. Furthermore, the welding may be achieved by the use of a metal interconnecting plate without overlapping the end portions of the metal band, as illustrated in another embodiment shown in FIG. 5. In this embodiment a metal interconnecting plate 11 is interposed between the end portions 3a and 3b of the metal band 3 and projections 6a and 6b, similar to those of the first embodiment $6a_1$ and $6a_2$, are provided on the end portions 3a and 3b and a current is applied across electrodes 4A and 4B placed on the backs or smooth sides of the projections 6a and 6b, thereby to effect welding. In this case bolsters 7-7 are provided on the both end portions 3a and 3b of the metal band 3 instead of just one end portion in spaced but adjacent relation to both ends 11a and 11b of the interconnecting plate 11 to ensure that the ends 11a and 11b of the plate 11 are not put into electrically good contact with the inner surfaces of the end portions 3a and 3b of the metal band 3. In FIGS. 4 and 5 elements similar to those in FIGS. 1 to 3 are marked with the same reference numerals and no further description will be given of them.

It is also possible to weld the overlapping both end portions of the metal band 3 in the same manner described with reference to FIGS. 3 and 4 and to weld the both end portions 3a and 3b to the interconnecting plate placed under the overlapping portion, though not shown. In this case a bolster abutting on the interconnecting plate may be provided on either of the end portions of the metal band overlying the other end portion at a position which does not overlie the other end portion and similar bolsters may be provided on the both end portions at places overlying the interconnecting plate. It will be understood that the mechanical coupling of the both ends of the metal band is not limited specifically to the aforementioned ones but may take place by other various methods.

In addition, it is possible to cut off the outer corner portion of the end 3b in FIGS. 3 and 4 and the ends 11a and 11b of the interconnecting plate 11 in FIG. 5 as indicated by broken lines in the figures, which serve as bypasses of the current path in the welding for direct or indirect coupling of the both end portions 3a and 3b of the metal band 3.

Although the metal band is once wound around the tube envelope in the foregoing examples, it has been found that the implosionproof effect can be enhanced by the use of two metal bands to reduce tension exerted to each band by half. In this case the welded portion of one band may be located on the side of the tube envelope opposite from that of the other band. It is possible, of course, to achieve the projection weld of the second band by the provision of the bolsters.

It will be apparent that many modifications and variations may be effected without departing from the scope of the novel concepts of this invention.

We claim as our invention:

1. Metal band means to be wrapped around a cathode-ray tube in tensioned condition and having at least two lapped end portions to be electrically welded to each other for securing the tensioned band means on the tube, in which one of said two lapped end portions has first projecting means extending therefrom to define a restricted region of contact with the other of said two end portions at which the welding is to be effected, and said band means further has second projecting means extending inwardly from a portion of said band means which is adjacent the end portion which is outermost at said two lapped end portions, said second projecting means being spaced in the longitudinal direction of said band means from the end portion overlapped by said outermost end portion so as to be adapted to engage the tube surface for spacing said outermost end portion from said end portion overlapped thereby except at said first projecting means.

2. Metal band means according to claim 1, in which said metal band means includes a main band portion of sufficient length to extend around a major part of the periphery of the tube and a bridging band portion extending between the ends of said main band portion and being in overlapping relation therewith, so that said two lapped end portions are constituted by one end of said main band portion and the adjacent end of said bridging band portion and another two lapped end portions are constituted by the other ends of said main and bridging band portions, and in which said band means has said first and second projecting means for said other two lapped end portions as well as for the first-mentioned two lapped end portions.

3. Metal band means in accordance with claim 1, in which the band means has at least one other projecting means spaced apart from said lapped end portions, and being adapted to be engaged by means for tensioning the band means.

4. Metal band means in accordance with claim 1, in which the band means further includes a plurality of fixtures welded thereto for mounting the cathode-ray tube.

5. Metal band means in accordance with claim 1, in which the band means is a metal strap.

6. Metal band means in accordance with claim 5, in which said first projecting means includes at last two projections spaced apart along said strap.

7. Metal band means in accordance with claim 6, in which the metal strap has at least one other projecting means spaced apart from said first and second projecting means and being adapted to be engaged by means for tensioning the band means.

8. Metal band means according to claim 1, in which a highly electrically conductive member is disposed at the inner side of said band means along said lapped end portions which are to be electrically welded.

9. Metal band means according to claim 8, in which an adiabatic member is disposed at the inner side of said conductive member so as to be interposed between the latter and the tube on which the band is to be secured.

10. Metal band means according to claim 9, in which a deformable member having a low coefficient of friction with respect to the band and the tube on which the band is to be secured is disposed at the inner side of said adiabatic member so as to be interposed between the latter and the tube on which the band is to be secured so as to decrease the frictional resistance of the band to the tube, the deformable member being adiabatic and heat-resistant.